Jan. 26, 1926.
J. D. REED
TOY BALLOON VALVE
Filed Dec. 9, 1922
1,570,642
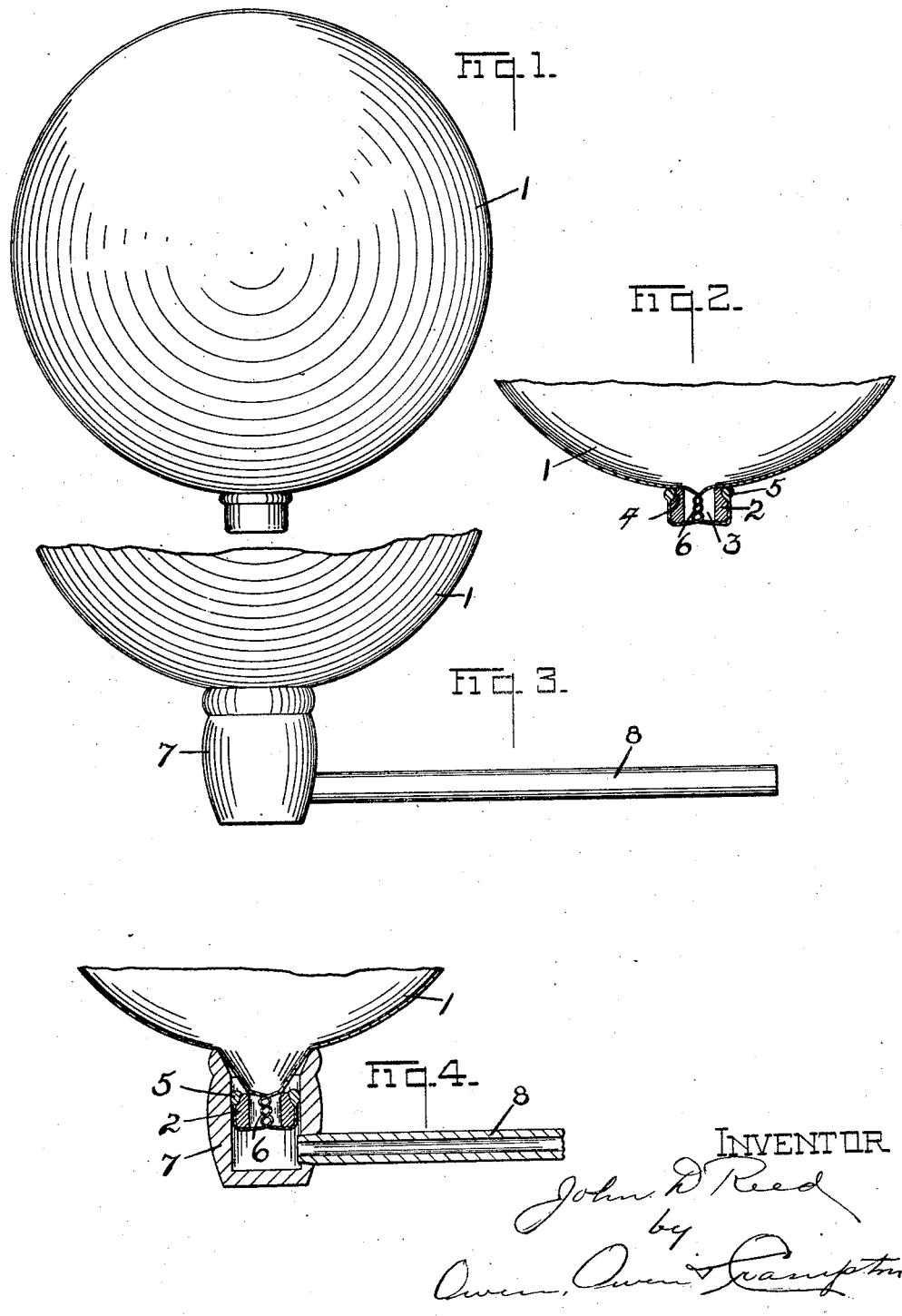

Patented Jan. 26, 1926.

1,570,642

UNITED STATES PATENT OFFICE.

JOHN D. REED, OF TOLEDO, OHIO.

TOY-BALLOON VALVE.

Application filed December 9, 1922. Serial No. 605,781.

*To all whom it may concern:*

Be it known that I, JOHN D. REED, a citizen of the United States, and a resident of Toledo, in the county of Lucas and State of Ohio, have made an Invention Appertaining to a Toy-Balloon Valve; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a valve for toy balloons that is exceedingly simple in its construction, exceedingly light in weight compared to the weight of the balloon, that may be easily manipulated to close the inlet of the balloon after it has been expanded by the pressure of air or other gas forced into the balloon, and which will securely maintain the inlet of the balloon closed, notwithstanding the jarring or bouncing to which such balloons are commonly subjected.

Valves containing the invention may be modified in the details of their construction. To illustrate a practical application of the invention I have selected a valve containing the invention and shall describe it hereinafter. The valve selected for purposes of illustration is shown in the accompanying drawings.

Figure 1 of the drawings illustrates a side view of a balloon having a valve embodying my invention. Fig. 2 is a sectional and broken view of the device illustrated in Fig. 1. Fig. 3 illustrates a side view of a device for holding the balloon and the valve. Fig. 4 is a sectional view of the device illustrated in Fig. 3.

In the figures 1 indicates the balloon, which is shown as only partially "blown up" since the balloon itself is shown small in comparison with the valve. The balloon 1 is formed of the usual thin sheet rubber and is provided with the usual inlet stem of the desired length. The stem, however, may be varied in length, but it is desirable that the stem be not too long, for the reasons that will hereinafter appear.

The valve member 2 consists of a small ring formed preferably of light wood. The ring 2 is of small diameter and is provided with a small opening 3. The height of the ring may be varied. The ring may be made much shorter relative to its diameter than that indicated in Figs. 2 and 4. The height of the ring depends largely on the convenience of manipulating the valve when it is used as a mouth-piece for inflating the balloon. It is, however, preferably made as short as possible in order to reduce the weight of the valve and thus to reduce the unbalancing effect that may be due to the weight of the ring.

The ring is provided with a rabbeted end 4 and the stem of the balloon is provided with the usual bead 5 which substantially fits the rabbeted corner 4 of the valve member 2. The stem 6 of the balloon is inserted through the valve member 2 and is then stretched over the outside of the valve member until the stretched bead 5 sets into the rabbeted corner 4, where it is held by the elasticity of the rubber. This leaves a free opening through which the balloon may be inflated. The balloon may then be inflated by blowing with the mouth through the stem, as is common, or by connecting the valve member with any other device through which air or gas under pressure may be supplied to the balloon. When the balloon has been "blown up" or inflated to the desired extent the stem is twisted by rotating either the valve member or the balloon, one relative to the other. This causes the stem to pull the valve member 2 against the surface of the balloon, as shown in Fig. 2, and reverse rotation of the valve member relative to the balloon is prevented by the frictional engagement between the valve member and the surface of the balloon about the stem. The valve member 2 is thus held in its closed position by the frictional contact between the edge of the valve member 2 and the balloon. This frictional engagement is increased if the surface of the balloon makes contact with the bead 5 located in the recess or rabbeted corner 4 since the friction between the rubber of which the bead and the balloon body are formed is greater than the friction between the rubber of the balloon and the wood of which the valve member 2 is formed. In either case, however, the valve member is held in its closed position. After the valve member has been twisted it may be freed from the source of air or gas pressure supply.

A means for conveniently "blowing" or inflating the balloon is shown in Figs. 3 and 4, wherein the valve member may be readily secured while the inflating process is being carried out. It will thus be seen that when any device is used for securing the valve member during the inflation that the valve members may be made much shorter. In the form of device illustrated in Figs. 3 and 4, however, I have shown a valve member having dimensions substantially the same as that of the valve member shown in Figs. 1 and 2. The device for securing the valve member shown in Figs. 3 and 4 is a tobacco pipe or an imitation of a pipe. It is provided with a bowl 7 having an inner diameter slightly larger than the outer diameter of the valve member 2 and yet smaller than the outside diameter of the bead 5 when in position on the valve member 2. The valve member may be pushed into the bowl 7, the bead 5 being slightly compressed it will sufficiently engage the bowl to hold the valve member in position notwithstanding the air pressure to which the balloon is subjected when inflated because of the binding engagement that is produced by the rubber of which the bead 5 is formed, and because of the frictional engagement that is thereby produced. The balloon may then be inflated by blowing through the stem 8 of the pipe or by connecting the pipe 8 with a source of air or gas pressure supply. When the balloon has been inflated to the desired extent it may be rotated relative to the pipe so as to twist the stem 6. This will cause the edge of the bowl of the pipe to engage the surface of the balloon and prevent the reverse rotation that might otherwise occur by reason of the elasticity of the rubber. This maintains the valve, located within the pipe, in its closed position relative to the balloon. If desired, however, the balloon may be pulled upwards to remove the valve member 2 from the bowl of the pipe, which will immediately engage with the surface of the balloon and maintain the valve member closed. If desired, the valve member may be removed by any other suitable means.

I claim:

1. In a toy rubber balloon valve, the balloon having a stem, a ring through which the stem is inserted, and spread over the entire outside surface of the ring, the end portion of the stem located in position so that the soft rubber of the stem of the balloon will make contact with the soft rubber of the inflated body portion of the balloon to retain the ring and stem in position relative to the body portion of the balloon when the body portion of the stem is twisted to seal the balloon.

2. In a toy rubber balloon valve, the balloon having a stem, a ring through which the stem is inserted and spread over the entire outside surface of the ring in a stretched condition, the end edge of the stem of the balloon having a bead and located in position so that the soft rubber of the bead of the stem will make contact with the soft rubber of the surface of the body portion of the inflated balloon.

3. In a toy balloon valve, the balloon having a stem, a ring through which the stem is inserted and located on the outside surface of the ring in a stretched condition, the edge of the stem of the balloon having a bead and located in position to make contact with the surface of the body portion of the inflated balloon, a recess formed in the edge of the ring for receiving and holding the bead in position.

4. In a device of the kind described, a balloon, the balloon having a stem, a ring through which the stem is inserted and located on the outside surface of the ring in a stretched condition, the edge of the stem of the balloon having a bead, and a recess formed in the edge of the ring for receiving the bead, a pipe having a bowl, the bead substantially fitting the bowl of the pipe and operating to retain the balloon within the pipe notwithstanding the pressure of the air used in filling the balloon and the drawing of the stem as the balloon is filled.

5. In a device of the kind described, a balloon, the balloon having a stem, a ring through which the stem is inserted and located on the outside of the ring in a stretched condition, a pipe having a bowl, a portion of the stem located on the outside of the ring substantially fitting the bowl of the pipe and operating to retain the balloon within the pipe notwithstanding the pressure of the air used in filling the balloon and the drawing of the stem as the balloon is filled.

In testimony whereof, I have hereunto signed my name to this specification.

JOHN D. REED.